United States Patent
Duan et al.

(10) Patent No.: US 11,292,346 B2
(45) Date of Patent: Apr. 5, 2022

(54) BATTERY POWER CONTROL SYSTEM FOR HYBRID/ELECTRIC VEHICLES

(71) Applicant: FORD GLOBAL TECHNOLOGIES, LLC, Dearborn, MI (US)

(72) Inventors: Xiaohong Nina Duan, Canton, MI (US); Yanan Zhao, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 16/749,338

(22) Filed: Jan. 22, 2020

(65) Prior Publication Data
US 2021/0221238 A1 Jul. 22, 2021

(51) Int. Cl.
| | | |
|---|---|---|
| *B60L 50/61* | (2019.01) | |
| *B60L 58/15* | (2019.01) | |
| *B60W 20/19* | (2016.01) | |
| *B60W 20/14* | (2016.01) | |

(52) U.S. Cl.
CPC ............... *B60L 50/61* (2019.02); *B60L 58/15* (2019.02); *B60W 20/14* (2016.01); *B60W 20/19* (2016.01); *B60L 2210/10* (2013.01)

(58) Field of Classification Search
None
See application file for complete search history.

(56) References Cited

U.S. PATENT DOCUMENTS

| | | | | |
|---|---|---|---|---|
| 2013/0038271 | A1* | 2/2013 | Park | B60L 58/20 320/104 |
| 2015/0321573 | A1* | 11/2015 | Sato | B60L 58/27 701/22 |
| 2016/0362020 | A1* | 12/2016 | Shepley | B60W 20/14 |

FOREIGN PATENT DOCUMENTS

KR 20190113090 A 10/2019

* cited by examiner

*Primary Examiner* — Jared Fureman
*Assistant Examiner* — Aqeel H Bukhari
(74) *Attorney, Agent, or Firm* — David B Kelley; Brooks Kushman P.C.

(57) ABSTRACT

A vehicle includes an electric machine, a traction battery, a low-voltage power system, a DC to DC converter, and a controller. The electric machine is configured to accelerate the vehicle and to slow the vehicle. The traction battery is configured to deliver electrical power to the electric machine and to receive electrical power from the electric machine via a high-voltage bus. The low-voltage power system has vehicle accessories, an accessory battery, and a low-voltage bus. The DC to DC converter is configured to transfer electrical power between the high-voltage bus and the low-voltage bus. The accessory battery is configured to deliver electrical power to the vehicle accessories and to receive or deliver power from or to DC to DC converter via the low-voltage bus. The controller is configured to controller the transfer of electrical power between the high-voltage bus and the low-voltage bus.

20 Claims, 2 Drawing Sheets

BATTERY POWER CONTROL SYSTEM FOR HYBRID/ELECTRIC VEHICLES

TECHNICAL FIELD

The present disclosure relates to control systems for hybrid/electric vehicles.

BACKGROUND

Electric vehicles may include an electric battery that is configured to deliver electric power to an electric machine that is configured to propel the vehicle.

SUMMARY

A vehicle includes an electric machine, a traction battery, a low-voltage power system, a DC to DC converter, and a controller. The electric machine is configured to accelerate the vehicle and to slow the vehicle during regenerative braking. The traction battery is configured to deliver electrical power to the electric machine during periods of acceleration and to receive electrical power from the electric machine during periods of regenerative braking via a high-voltage bus. The DC to DC converter is configured to transfer electrical power between the high-voltage bus and a low-voltage bus. The low-voltage power system includes vehicle accessories, an accessory battery, and the low-voltage bus. The relative voltage of the low-voltage power system is lower than a voltage of the traction battery. The accessory battery is configured to deliver electrical power to the vehicle accessories and to receive or deliver electrical power from or to the DC to DC converter via the low-voltage bus. The controller is programmed to, responsive to an acceleration request and a corresponding power requirement of the electric machine exceeding a power discharge capacity of the traction battery but not exceeding a combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge that is based on a difference between the corresponding power requirement of the electric machine and the power discharge capacity of the traction battery. The controller is further programmed to, responsive to the acceleration request and the corresponding power requirement of the electric machine exceeding the combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge capacity of the low-voltage power system. The controller is further programmed to, responsive to regenerative braking and a corresponding power generation value of the electric machine exceeding a power charging capacity of the traction battery but not exceeding a combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power generation value that is based on difference between the corresponding power generation value of the electric machine and the power charging capacity of the traction battery. The controller is further programmed to, responsive to the regenerative braking and the corresponding power generation value of the electric machine exceeding the combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power charging capacity of the low-voltage power system.

A vehicle includes an electric machine, a traction battery, a low-voltage power system, a DC to DC converter, and a controller. The electric machine is configured to accelerate the vehicle and to slow the vehicle during regenerative braking. The traction battery is configured to deliver electrical power to the electric machine during periods of acceleration and to receive electrical power from the electric machine during periods of regenerative braking via a high-voltage bus. The DC to DC converter is configured to transfer electrical power between the high-voltage bus and a low-voltage bus. The low-voltage power system includes vehicle accessories, an accessory battery, and the low-voltage bus. The relative voltage of the low-voltage power system is lower than a voltage of the traction battery. The accessory battery is configured to deliver electrical power to the vehicle accessories and to receive or deliver electrical power from or to the DC to DC converter via the low-voltage bus. The controller is programmed to, responsive to an acceleration request and a corresponding power requirement of the electric machine exceeding a power discharge capacity of the traction battery but not exceeding a combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge that is based on a difference between the corresponding power requirement of the electric machine and the power discharge capacity of the traction battery. The controller is further programmed to, responsive to the acceleration request and the corresponding power requirement of the electric machine exceeding the combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge capacity of the low-voltage power system.

A vehicle includes an electric machine, a traction battery, a low-voltage power system, a DC to DC converter, and a controller. The electric machine is configured to accelerate the vehicle and to slow the vehicle during regenerative braking. The traction battery is configured to deliver electrical power to the electric machine during periods of acceleration and to receive electrical power from the electric machine during periods of regenerative braking via a high-voltage bus. The DC to DC converter is configured to transfer electrical power between the high-voltage bus and a low-voltage bus. The low-voltage power system includes vehicle accessories, an accessory battery, and the low-voltage bus. The relative voltage of the low-voltage power system is lower than a voltage of the traction battery. The accessory battery is configured to deliver electrical power to the vehicle accessories and to receive or deliver electrical power from or to the DC to DC converter via the low-voltage bus. The controller is programmed to, responsive to regenerative braking and a corresponding power generation value of the electric machine exceeding a power charging capacity of the traction battery but not exceeding a combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power generation value that is based on difference between the corresponding power generation value of the electric machine and the power charging capacity of the traction battery. The controller is further programmed to, responsive to the regenerative braking and the corresponding power generation value of the electric machine exceeding the combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power charging capacity of the low-voltage power system.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
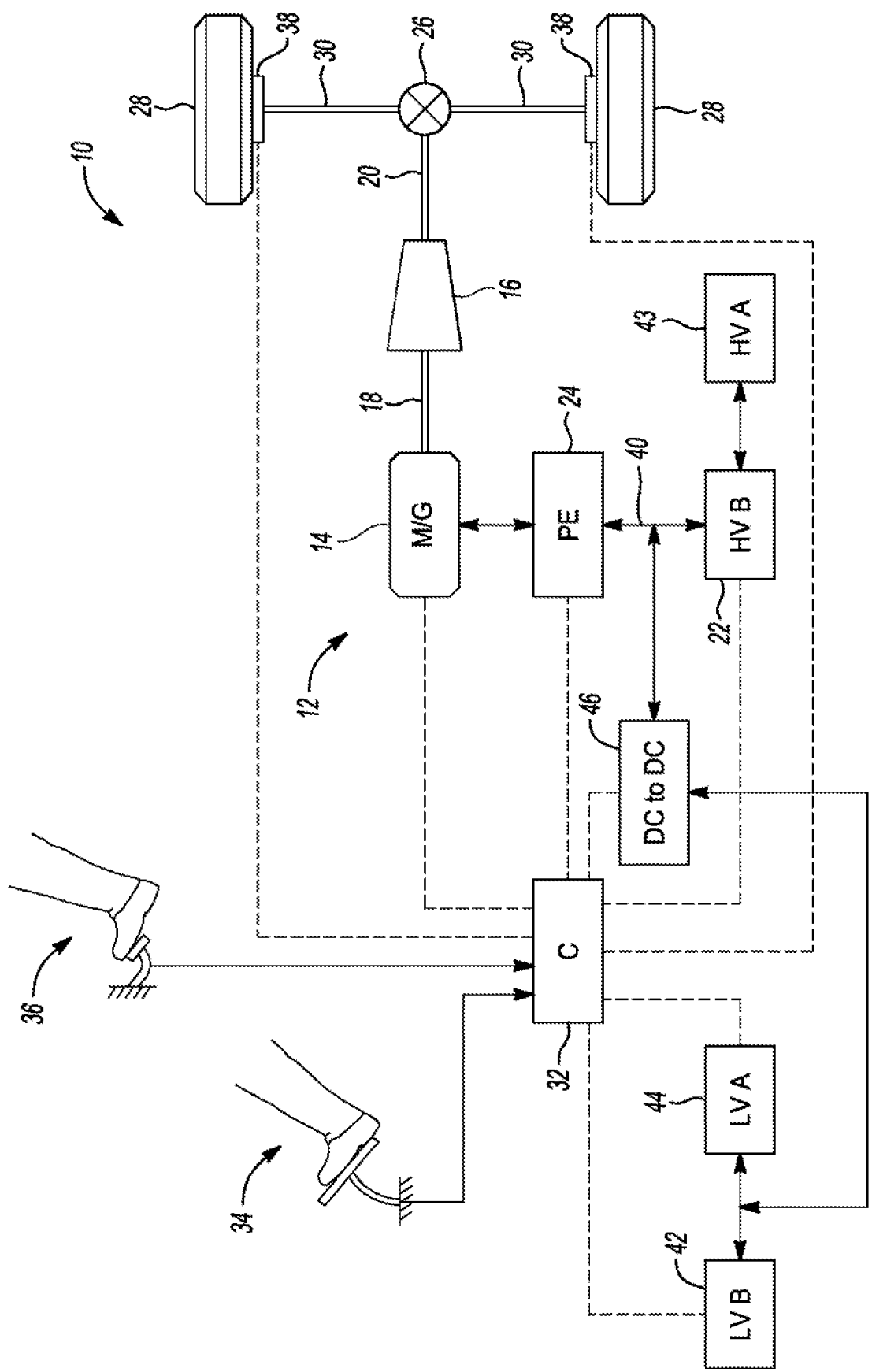
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the MG 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (ION), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The MG 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

The vehicle 10 may include one or more vehicle low-voltage accessories 42. The vehicle low-voltage accessories 42 may include, but are not limited to, power steering systems, radios, power windows, seat position adjustment systems, electrically operated door locks, head lights, interior cabin lights, or any other system or device that is electrically operated. The vehicle may include an accessory battery 44 that is configured to power the vehicle low-voltage accessories 42. The accessory battery 44 and the vehicle low-voltage accessories 42 may be in communication with and may be controlled by controller 32.

The accessory battery 44, the vehicle low-voltage accessories 42, and an associated bus that delivers power from the accessory battery 44 to the vehicle low-voltage accessories 42 may be referred to as a low-voltage power system, while, the traction battery 22, M/G 14, and an associated bus that delivers power from the traction battery 22 to the M/G 14 may be referred to as a high-voltage power system. This is because the traction battery 22, some accessories (such as the air conditioning system and the heating system), and the M/G 14 operate a higher voltage (e.g., 144-330 volts) relative to the accessory battery 44 and the vehicle low-voltage accessories 42 (e.g., 12 volts). The accessories that are powered by the high-voltage system (e.g., the air conditioning system and the heating system) may be referred to as the high-voltage accessories 43. Therefore, the traction battery 22 may be referred to as the high-voltage battery 22, the accessory battery 44 may be referred to as the low-voltage battery 44, the bus that delivers power from the traction battery 22 to the M/G 14 may be referred to as the high-voltage bus, and the bus that delivers power from the accessory battery 44 to the vehicle low-voltage accessories 42 may be referred to as the low-voltage bus. A DC to DC converter 46 may be configured to allow electrical power to flow from the low-voltage bus to the high-voltage bus and/or may be configured to allow electrical power to flow from the high-voltage bus to the low-voltage bus.

It should be understood that the schematic illustrated in FIG. 1 is merely representative and is not intended to be limiting. Other configurations are contemplated without deviating from the scope of the disclosure. It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

Figure 2:
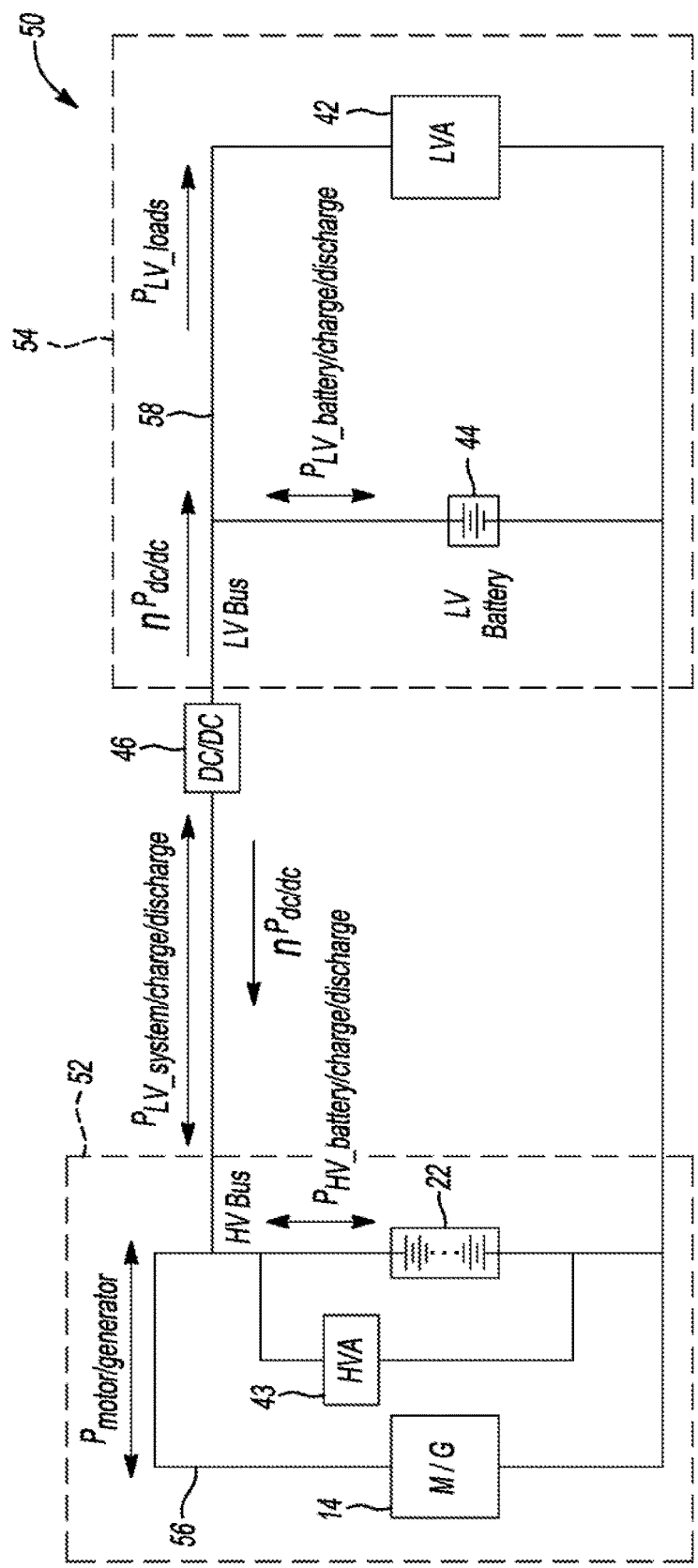
FIG. 2 is an electrical diagram that includes a high-voltage power system and a low-voltage power system.

Referring to FIG. 2, an electrical diagram 50 that includes the high-voltage power system 52 and the low-voltage power system 54 is illustrated. The high-voltage battery 22 may be configured to discharge electrical power to or receive a charging power, $P_{HV\ battery\ charge/Discharge}$, from the high-voltage bus 56. The M/G 14 may also be configured to consume electrical power to or generate a charging power, $P_{motor/generator}$, from the high-voltage bus 56. The low-voltage battery 44 may be configured to discharge electrical power to or receive a charging power, $P_{LV\ battery\ charge/Discharge}$, from the low-voltage bus 58. Some or all of the electrical power on the low-voltage bus 58 may be directed to the vehicle low-voltage accessories 42. The electrical power consumer by the vehicle low-voltage accessories 42 or any other component that is connected to the low-voltage bus 58 may be referred to as the load on the low-voltage bus, $P_{LV\_loads}$. The DC to DC converter 46 connects the low-voltage bus 58 to the high-voltage bus 56. The DC to DC converter 46 is configured to transfer electrical power between the low-voltage bus 58 and the high-voltage bus 56. The electrical power that is being delivered to the low-voltage bus 58 from the high-voltage bus 56 or that is being discharged from the low-voltage bus 58 and into the high-voltage bus 56 may be referred to as the low-voltage system charge/discharge power, $P_{LV\ battery\ charge/Discharge}$. The power flowing through the DC to DC converter 46 is adjusted by the efficiency, η, of the DC to DC converter 46.

Traditional electric or hybrid vehicle control strategies only take into account the power charging/discharging limits of the high-voltage battery. For example, the vehicle control system's electric propulsive assist, opportunistic charging, or regenerative braking functions are required to comply with the charging/discharging limits of the high-voltage battery. Therefore, the vehicle performance and fuel economy are constrained by the capabilities of high-voltage battery.

The energy demands for the low-voltage systems in vehicles, particularly autonomous vehicles, continues to increase. For example, the power/energy used by the low-voltage system of an autonomous vehicle may be more than twice the power/energy used by the low-voltage system of a conventional vehicle. The capacity of the low-voltage battery may be used to assist the powertrain control system in storing power/energy in or releasing power/energy from the high-voltage power system, which will benefit the overall vehicle performance and efficiency of the vehicle. A unidirectional DC to DC converter allows the low-voltage battery to store energy from the high-voltage power system. The use of a bi-directional DC to DC converter allows power to pass from the high-voltage power system to the low-voltage power system and vice versa.

The controller 32 is configured to control power flow between the high-voltage power system 52 and the low-voltage power system 54. For convenience, the DC to DC power flow from the high-voltage power system 52 to the low-voltage power system 54 will be defined as positive while the power flow from the low-voltage power system 54 to the high-voltage power system 52 will be as negative. When the DC to DC power flow is positive, the power capability of the low-voltage power system 54 may be defined as the capability or capacity the low-voltage power system 54 to accept power from the high-voltage power system 52, which may be defined by equation (1):

$$\text{Pwr\_sysLVChrgLim} = (P\_\text{battLVChrgLim} + P\_\text{LV-Load})/\text{Eff\_DCDCpos} \quad (1)$$

where Pwr_sysLVChrgLim is the capability or capacity of the low-voltage power system 54 to accept power from the high-voltage power system 52, P_battLVChrgLim is the capability or capacity of the low-voltage battery 44 receive charging power, P_LVLoad is the power load on the low-voltage power system 54 from the vehicle low-voltage accessories 42 or any other component that is connected to the low-voltage bus 58, and Eff_DCDCpos is the efficiency of the DC to DC converter 46 when the DC to DC power flow between the high-voltage power system 52 and the low-voltage power system 54 is positive.

When the DC to DC power flow is negative, the power capability of the low-voltage power system 54 may be defined as the capability or capacity the low-voltage power system 54 to deliver, send, or discharge power to the high-voltage power system 52, which may be defined by equation (2):

$$\text{Pwr\_sysLVDisChrgLim} = (P\_\text{battLVDisChrgLim} - P\_\text{LVLoad}) * \text{Eff\_DCDCneg} \quad (2)$$

where Pwr_sysLVDisChrgLim is the capability or capacity of the low-voltage power system 54 to deliver, send, or discharge power to the high-voltage power system 52, P_battLVDisChrgLim is the capability or capacity of the low-voltage battery 44 discharge power, P_LVLoad is the power load on the low-voltage power system 54 from the vehicle low-voltage accessories 42 or any other component that is connected to the low-voltage bus 58, and Eff_DCDCneg is the efficiency of the DC to DC converter 46 when the DC to DC power flow between the high-voltage power system 52 and the low-voltage power system 54 is negative.

The above definition on the total system power capability can be applied when the DC to DC converter 46 is either a unidirectional DC to DC converter or a bi-directional DC to DC converter. In the case of unidirectional DC to DC converter, the capability or capacity of the low-voltage power system 54 to deliver, send, or discharge power to the high-voltage power system 52, Pwr_sysLVDisChrgLim, will be zero (i.e., the battery discharging power limit for the entire system depicted in FIG. 2 to the high-voltage power system 52 will be from the high-voltage battery 22 only).

The overall battery power capability or capacity of the entire system depicted in FIG. 2 may be defined as the summation of the power capability or capacity of the high-voltage battery 22 and the power capability or capacity of low-voltage power system 54 for both charging and discharging. The overall battery power capability or capacity of the entire system depicted in FIG. 2 to accept or receive charging power may be defined by equation (3):

$$\text{Pwr\_battSysChrgLim} = \text{Pwr\_battHVChrgLim} + \text{Pwr\_sysLVChrgLim} \quad (3)$$

where Pwr_battSysChrgLim is the overall battery power capability or capacity of the entire system depicted in FIG. 2 to receive charging power, Pwr_battHVChrgLim is the capability or capacity of the high-voltage battery 22 to receive charging power, and Pwr_sysLVChrgLim is the capability or capacity of the low-voltage power system 54 to accept power from the high-voltage power system 52.

The overall battery power capability or capacity of the entire system depicted in FIG. 2 to deliver, send, or discharge power may be defined by equation (4):

$$\text{Pwr\_battSysDisChrgLim} = \text{Pwr\_battHVDisChrgLim} + \text{Pwr\_sysLVDisChrgLim} \quad (4)$$

where Pwr_battSysDisChrgLim is the overall battery power capability or capacity of the entire system depicted in FIG. 2 to deliver, send, or discharge power, Pwr_battHVDisChrgLim is the capability or capacity of the high-voltage battery 22 to deliver, send, or discharge power, and Pwr_sysLVChrgLim is the capability or capacity of the low-voltage power system 54 to deliver, send, or discharge power to the high-voltage power system 52. It should be noted that all the power capabilities of the entire system depicted in FIG. 2 are unsigned, (i.e., have a value that is greater than zero), regardless if the system is charging according equation (3) or discharging according equation (4).

The desired power, Pwr_EMDes, of the M/G 14 and the high-voltage accessories 43 may be based on the usage control of the low-voltage power system 54 and the high-voltage power system 52. The desired power, Pwr_EMDes, may be positive (e.g., when driver accelerates the vehicle and powertrain utilizes the M/G 14 for driving assist or when the recuperate power of the M/G 14 is less that power consumed by the high-voltage accessories). The desired power, Pwr_EMDes, may be negative (e.g., when the driver brakes the vehicle and the powertrain utilizes the M/G 14 to recuperate the kinetic energy via regenerative braking or when battery charging is desired for battery SOC maintenance or engine optimal operation even when driver intends to accelerate the vehicle). For the purposes of this disclosure it is assumed that the overall battery system discharge power is positive and that the overall battery system charge power is negative.

The system for controlling the electrical power flow of the system of depicted in FIG. 2 is described immediately below. The system for controlling the electrical power flow of the system depicted in FIG. 2 may be stored as an algorithm or control logic within the controller 32.

A desired power, Pwr_EMDes, of the M/G 14 and the high-voltage accessories 43 may correspond to an acceleration request via the accelerator pedal 34 during periods where the M/G 14 is being used to propel the vehicle or may correspond to an event where the M/G 14 is being utilized as a generator (e.g., during a regenerative braking event). Pwr_EMReq is the power request of the MG 14 after considering the total battery system capability or capacity. Pwr_sysLVReq is the desired power from the low-voltage power system 54 to meet Pwr_EMReq. The power request of the M/G 14 after considering the total battery system capability or capacity, Pwr_sysLVReq, may be used to control the DC to DC converter 46 to provide the necessary power, and may be utilized to control the power output of the M/G 14. When considering power capacities, limits, or capably of the low-voltage power system 54, the high-voltage power system 52, the high-voltage battery 22, and the low-voltage battery (i.e., accessory battery 44) in the algorithm described below, the values may need to be adjusted by the efficiency, q, of the DC to DC converter 46 when power is flowing between the low-voltage power system 54 and the high-voltage power system 52.

If the desired power, Pwr_EMDes, of the M/G 14 and the high-voltage accessories 43 is positive (i.e. the sum of the power the M/G 14 and the high-voltage accessories 43 is discharging from one or more of the batteries), the controller 32 controls the power flow of the system depicted in FIG. 2 as follows:

If the desired power, Pwr_EMDes, of the M/G 14 and the high-voltage accessories 43 is greater than or equal to the overall battery power capability or capacity of the entire system, Pwr_battSysChrgLim (i.e., if Pwr_EMDes>=Pwr_battSysDisChrgLim), then (1) the power request of the M/G 14 and the high-voltage accessories 43 after considering the total battery system capability or capacity, Pwr_EMReq, is set so that it is equal to the overall battery power capability or capacity of the entire system, Pwr_battSysChrgLim (i.e., Set: Pwr_EMReq Pwr_battSysDisChrgLim), and the electrical power delivered to the M/G 14 and the high-voltage accessories 43 is set to the overall battery power capability or capacity of the entire system to discharge power, Pwr_battSysDisChrgLim (i.e., desired power of the M/G 14 and the high-voltage accessories 43 is clipped by the total system capability); and (2) the desired power from the low-voltage power system 54, Pwr_sysLVReq, is set so that it is equal to the capability or capacity of the low-voltage power system 54 to deliver, send, or discharge power to the high-voltage power system 52, Pwr_sysLVDisChrgLim (i.e., Set: Pwr_sysLVReq=Pwr_sysLVDisChrgLim) and the low-voltage battery (i.e., accessory battery 44), will be used at its full capability to deliver discharging power. Please note that if Pwr_EMDes>Pwr_battSysDisChrgLim, the system will be unable to meet the desired power, Pwr_EMDes, of the M/G 14 and the high-voltage accessories 43. It should be noted that under such a circumstance, the high-voltage battery 22 will be discharged to deliver power to the M/G 14 and the high-voltage accessories 43 at the capability or capacity of the high-voltage battery 22 to deliver, send, or discharge power, Pwr_battHVDisChrgLim.

If the desired power, Pwr_EMDes, of the M/G 14 and the high-voltage accessories 43 is greater than the capability or capacity of the high-voltage battery 22 to deliver, send, or discharge power, Pwr_battHVDisChrgLim (i.e., if Pwr_EMDcs>Pwr_battHVDisChrgLim) and the desired power, Pwr_EMDes, of the M/G 14 and the high-voltage accessories 43 can be met by the overall battery discharge power capability or capacity of the entire system, Pwr_battSysDisChrgLim (i.e., Pwr_EMDes<=Pwr_battSysDisChrgLim), (1) the power request of the M/G 14 after considering the total battery system capability or capacity, Pwr_EMReq, is set so that it is equal to is set to the desired power, Pwr_EMDes, of the M/G 14 and the high-voltage accessories 43 (i.e., Set: Pwr_EMReq=Pwr_EMDes) and the electrical power delivered to the M/G 14 and the high-voltage accessories 43 is set to the desired power, Pwr_EMDes, of the M/G 14 and the high-voltage accessories 43; and (2) the desired power from the low-voltage power system 54, Pwr_sysLVReq, is set so that it is equal to the difference between the power request of the M/G 14 and the high-voltage accessories 43 after considering the total battery system capability or capacity, Pwr_EMReq, and the capability or capacity of the high-voltage battery 22 to deliver, send, or discharge power, Pwr_battHVDisChrgLim (i.e., Set: Pwr_sysLVReq=Pwr_EMReq−Pwr_battHVDisChrgLim). Stated in other terms, the high-voltage battery 22 will be discharged at the capability or capacity of the high-voltage battery 22 to deliver, send, or discharge power, Pwr_battHVDisChrgLim, while the low-voltage battery (i.e., accessory battery 44) will be discharged at a value to fill the gap between the desired power, Pwr_EMDes, of the M/G 14 and the high-voltage accessories 43 and the capability or capacity of the high-voltage battery 22 to deliver, send, or discharge power, Pwr_battHVDisChrgLim.

If the high-voltage battery 22 battery alone can meet the power request of the M/G 14, (1) the power request of the M/G 14 and the high-voltage accessories 43 after considering the total battery system capability or capacity, Pwr_EMReq, is set so that it is equal to is set to the desired power, Pwr_EMDes, of the M/G 14 and the high-voltage accessories 43 (i.e., Set: Pwr_EMReq=Pwr_EMDes) and the electrical power delivered to the M/G 14 is set to the desired power, Pwr_EMDes, of the M/G 14 and the high-voltage accessories 43; and (2) the desired power from the low-voltage power system 54, Pwr_sysLVReq, is set so that it is equal to zero. It should be noted that under such a circumstance, the high-voltage battery 22 alone is utilized to power the M/G 14 and the high-voltage accessories 43.

If the desired power, Pwr_EMDes, of the M/G 14 and the high-voltage accessories 43 is negative (i.e., the M/G 14 is delivering charging power to the one or more of the batteries), the controller 32 controls the power flow of the system depicted in FIG. 2 as follows:

If the absolute value of the desired power, Pwr_EMDes, of the M/G 14 and the high-voltage accessories 43 is greater than or equal to the overall battery power capability or capacity of the entire system depicted in FIG. 2 to receive charging power, Pwr_battSysChrgLim (i.e., if abs(Pwr_EMDes)>=Pwr_battSysChrgLim), then (1) the power request of the M/G 14 and the high-voltage accessories 43 after considering the total battery system capability or capacity to receive power, Pwr_EMReq, is set so that it is equal to the overall battery power capability or capacity of the entire system to receive power, Pwr_battSysChrgLim (Pwr_EMReq=−Pwr_battSysChrgLim), and the electrical power delivered from the M/G 14 is set to the overall battery power capability or capacity of the entire system, Pwr_battSysChrgLim (i.e., desired power of the M/G 14 is clipped by the total system capability); and (2) the desired power from the low-voltage power system 54, Pwr_sysLVReq, is set so that it is equal the capability or capacity of the low-voltage power system 54 to accept power from the high-voltage power system 52, Pwr_sysLVChrgLim, (i.e., Set: Pwr_sysLVReq=−Pwr_sysLVChrgLim) and the low-voltage battery (i.e., accessory battery 44), will be used at its full capability to receive charging power. It should be noted that under such a circumstance, the high-voltage battery 22 will receive charging power from the MG 14 at the capability or capacity of the high-voltage battery 22 to receive charging power, Pwr_battHVChrgLim.

If the absolute value of the desired power, Pwr_EMDes, of the M/G 14 and the high-voltage accessories 43 is greater than the capability or capacity of the high-voltage battery 22 to receive charging power, Pwr_battHVChrgLim (i.e., if abs(Pwr_EMDes)>Pwr_battHVChrgLim) and the desired power of the M/G 14 and the high-voltage accessories 43, Pwr_EMDes, can be met by the overall battery charge power capability or capacity of the entire system, Pwr_battSysChrgLim (i.e., Pwr_EMDes<=Pwr_battSysChrgLim), (1) the power request of the M/G 14 after considering the total battery system capability or capacity, Pwr_EMReq, is set so that it is equal to is set to the desired power, Pwr_EMDes, of the M/G 14 and the high-voltage accessories 43 (i.e., Set: Pwr_EMReq=Pwr_EMDes) and the electrical power delivered from the MG 14 is set to the desired power, Pwr_EMDes, of the MG 14 and the high-voltage accessories 43; and (2) the desired power to the low-voltage power system 54, Pwr_sysLVReq, is set so that it is equal to the difference between the power request of the M/G 14 after considering the total battery system capability or capacity, Pwr_EMReq, and the capability or capacity of the high-voltage battery 22 to receive charging power, Pwr_battHVChrgLim (i.e., Set: Pwr_sysLVReq=Pwr_EMReq−Pwr_battHVChrgLim). Stated in other terms, the high-voltage battery 22 will be charged at the capability or capacity of the high-voltage battery 22 to receive charging power, Pwr_battHVChrgLim, while low-voltage battery (i.e., accessory battery 44) will be charged at a value to fill the gap between the desired power of the M/G 14 and the high-voltage accessories 43, Pwr_EMDes, and the capability or capacity of the high-voltage battery 22 to receive charging power, Pwr_battHVChrgLim, from the M/G 14.

If the high-voltage battery 22 battery alone can meet the power request of the M/G 14 and the high-voltage accessories 43, (1) the power request of the M/G 14 after considering the total battery system capability or capacity, Pwr_EMReq, is set so that it is equal to is set to the desired power, Pwr_EMDes, of the M/G 14 and the high-voltage accessories 43 (i.e., Set: Pwr_EMReq=Pwr_EMDes) and the electrical power delivered from the M/G 14 is set to the desired power, Pwr_EMDes, of the M/G 14 and the high-voltage accessories 43; and (2) the desired power to the low-voltage power system 54, Pwr_sysLVReq, is set so that it is equal to zero. It should be noted that under such a circumstance, the high-voltage battery 22 alone is receives charging power from the M/G 14.

Figure 3:
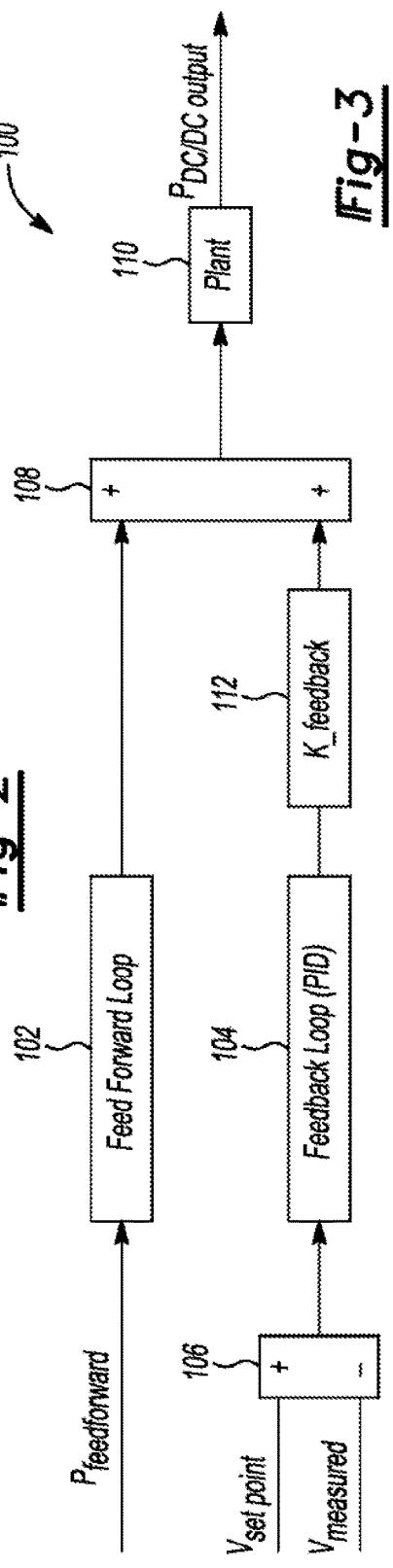
FIG. 3 is a control diagram illustrating a control system for a DC to DC converter.

Referring to FIG. 3, a control diagram 100 illustrating a control system for the DC to DC converter 46 is illustrated. The DC to DC converter 46 is controlled such that that the low-voltage battery (i.e., accessory battery 44) may operate to either receive or supply the required power from the high-voltage power system 52 according to the algorithm described above. In order to control the DC to DC converter 46, the power or current passing through the DC to DC converter 46 may be regulated through a feedforward loop 102 and feedback loop 104.

In the case that the desired power to or from the low-voltage power system 54, Pwr_sysLVReq, is zero there is no need to use the low-voltage battery (i.e., accessory battery 44). Under such a circumstance, the power passing through the DC to DC converter 46 is determined by the load on the low-voltage bus 58 as well as the requirement of a regular voltage on the low-voltage bus 58. The input power, $P_{feedforward}$, of the feedforward loop 102 is the power at the high-voltage bus 56 side of the DC to DC converter 46. The input power, $P_{feedfoward}$, of the feedforward loop 102 is determined by the power load of low-voltage electrical components (i.e., the power load of the vehicle low-voltage accessories 42 or any other component that is connected to the low-voltage bus 58). The input power, $P_{feedforward}$, of the feedforward loop 102 may be represented by equation (5):

$$P_{feedforward} = P\_LV\_load / \eta \quad (5)$$

where P_LV_load is the load on the low-voltage bus 58 and 1 is the efficiency of the DC to DC converter 46.

The feedback control loop 104 includes a controller (e.g., a PID controller) that receives a low-voltage bus voltage desired value or set point, $V_{set\ point}$, and a measured low-voltage bus voltage, $V_{measured}$, to generate a feedback control variable. The low-voltage bus voltage desired value or set point, $V_{set\ point}$, may be the voltage of the low-voltage battery (i.e., accessory battery 44). The difference between the set point, $V_{set\ point}$, and the measured low-voltage bus voltage, $V_{measured}$, may be determined at block 106 and fed into the controller of feedback control loop 104. The control variables from the feedforward loop 102 and the feedback loop 104 are added together at summation block 108 and then fed into the plant at block 110, which determines the power passing through DC to DC converter 46, $P_{DCDC\ output}$. The low-voltage bus voltage set point, $V_{set\ point}$, may be set as a temperature dependent calibratable value.

In the case that the desired power to or from the low-voltage power system 54, Pwr_sysLVReq, is not equal to zero, the power passing through the DC to DC converter 46 is determined by the need of high-voltage bus 56 load. The function of regulating low-voltage bus 58 voltage may be suspended by setting a K_feedback value to zero at block 112. Under such a circumstance, the input power of feedforward loop, $P_{feedforward}$, at high-voltage bus 56 side of the DC to DC converter 46, will be set according to equation (6):

$$P_{feedforward} = -Pwr\_sysLVReq \quad (6)$$

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to accelerate the vehicle and to slow the vehicle during regenerative braking;
   a traction battery configured to deliver electrical power to the electric machine during periods of acceleration and to receive electrical power from the electric machine during periods of regenerative braking via a high-voltage bus;
   a DC to DC converter configured to transfer electrical power between the high-voltage bus and a low-voltage bus;
   a low-voltage power system having vehicle accessories, an accessory battery, and the low-voltage bus, wherein a relative voltage of the low-voltage power system is lower than a voltage of the traction battery, and wherein the accessory battery is configured to deliver electrical power to the vehicle accessories and to receive or deliver electrical power from or to the DC to DC converter via the low-voltage bus; and
   a controller programmed to,
   responsive to an acceleration request and a corresponding power requirement of the electric machine exceeding a power discharge capacity of the traction battery but not exceeding a combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge that is based on a difference between the corresponding power requirement of the electric machine and the power discharge capacity of the traction battery, responsive to the acceleration request and the corresponding power requirement of the electric machine exceeding the combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge capacity of the low-voltage power system, responsive to regenerative braking and a corresponding power generation value of the electric machine exceeding a power charging capacity of the traction battery but not exceeding a combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power generation value that is based on difference between the corresponding power generation value of the electric machine and the power charging capacity of the traction battery, and responsive to the regenerative braking and the corresponding power generation value of the electric machine exceeding the combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power charging capacity of the low-voltage power system.

2. The vehicle of claim 1, wherein the controller is further programmed to, responsive to the acceleration request and the corresponding power requirement of the electric machine being less than the power discharge capacity of the traction battery, deliver power from the traction battery to the electric machine via the high-voltage bus at the corresponding power requirement of the electric machine.

3. The vehicle of claim 1, wherein the controller is further programmed to, responsive to the regenerative braking and the corresponding power generation value of the electric machine being less than the power charging capacity of the traction battery, deliver power from the electric machine to the traction battery via the high-voltage bus at the corresponding power generation value of the electric machine.

4. The vehicle of claim 1, wherein the power discharge capacity of the low-voltage power system is based on an efficiency of the DC to DC converter and a difference between a discharge limit of the accessory battery and a power requirement of the vehicle accessories.

5. The vehicle of claim 1, wherein the power charging capacity of the low-voltage power system is based on an efficiency of the DC to DC converter and a sum between a charging limit of the accessory battery and a power requirement of the vehicle accessories.

6. A vehicle comprising:
an electric machine configured to accelerate the vehicle and to slow the vehicle during regenerative braking;
a traction battery configured to deliver electrical power to the electric machine during periods of acceleration and to receive electrical power from the electric machine during periods of regenerative braking via a high-voltage bus;
a DC to DC converter configured to transfer electrical power between the high-voltage bus and a low-voltage bus;
a low-voltage power system having vehicle accessories, an accessory battery, and the low-voltage bus, wherein a relative voltage of the low-voltage power system is lower than a voltage of the traction battery, and wherein the accessory battery is configured to deliver electrical power to the vehicle accessories and to receive or deliver electrical power from or to the DC to DC converter via the low-voltage bus; and
a controller programmed to,
responsive to an acceleration request and a corresponding power requirement of the electric machine exceeding a power discharge capacity of the traction battery but not exceeding a combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge that is based on a difference between the corresponding power requirement of the electric machine and the power discharge capacity of the traction battery, and
responsive to the acceleration request and the corresponding power requirement of the electric machine exceeding the combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge capacity of the low-voltage power system.

7. The vehicle of claim 6, wherein the controller is further programmed to, responsive to regenerative braking and a corresponding power generation value of the electric machine exceeding a power charging capacity of the traction battery but not exceeding a combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power generation value that is based on difference between the corresponding power generation value of the electric machine and the power charging capacity of the traction battery.

8. The vehicle of claim 7, wherein the controller is further programmed to, responsive to the regenerative braking and the corresponding power generation value of the electric machine exceeding the combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power charging capacity of the low-voltage power system.

9. The vehicle of claim 6, wherein the controller is further programmed to, responsive to the acceleration request and the corresponding power requirement of the electric machine being less than the power discharge capacity of the traction battery, deliver power from the traction battery to the electric machine via the high-voltage bus at the corresponding power requirement of the electric machine, and deliver zero power from the low-voltage power system to the electric machine.

10. The vehicle of claim 6, wherein the controller is further programmed to, responsive to the regenerative braking and the corresponding power generation value of the electric machine being less than the power charging capacity of the traction battery, deliver power from the electric machine to the traction battery via the high-voltage bus at the corresponding power generation value of the electric machine.

11. The vehicle of claim 6, wherein the power discharge capacity of the low-voltage power system is based on an efficiency of the DC to DC converter and a difference between a discharge limit of the accessory battery and a power requirement of the vehicle accessories.

12. The vehicle of claim 6, wherein the power charging capacity of the low-voltage power system is based on an efficiency of the DC to DC converter and a sum between a charging limit of the accessory battery and a power requirement of the vehicle accessories.

13. A vehicle comprising:
an electric machine configured to accelerate the vehicle and to slow the vehicle during regenerative braking;
a traction battery configured to deliver electrical power to the electric machine during periods of acceleration and to receive electrical power from the electric machine during periods of regenerative braking via a high-voltage bus;
a DC to DC converter configured to transfer electrical power between the high-voltage bus and a low-voltage bus;
a low-voltage power system having vehicle accessories, an accessory battery, and the low-voltage bus, wherein a relative voltage of the low-voltage power system is lower than a voltage of the traction battery, and wherein the accessory battery is configured to deliver electrical power to the vehicle accessories and to receive or deliver electrical power from or to the DC to DC converter via the low-voltage bus; and
a controller programmed to,
responsive to regenerative braking and a corresponding power generation value of the electric machine exceeding a power charging capacity of the traction battery but not exceeding a combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power generation value that is based on difference between the corresponding power generation value of the electric machine and the power charging capacity of the traction battery, and
responsive to the regenerative braking and the corresponding power generation value of the electric machine exceeding the combined power charging capacity of the traction battery and the low-voltage power system, deliver power from the electric machine to the traction battery via the high-voltage bus at the power charging capacity of the traction battery, and deliver power from the electric machine to the low-voltage power system via the high-voltage bus, the DC to DC converter, and the low-voltage bus at a power charging capacity of the low-voltage power system.

14. The vehicle of claim 13, wherein the controller is further programmed to, responsive to an acceleration request and a corresponding power requirement of the electric machine exceeding a power discharge capacity of the traction battery but not exceeding a combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge that is based on a difference between the corresponding power requirement of the electric machine and the power discharge capacity of the traction battery.

15. The vehicle of claim 14, wherein the controller is further programmed to, responsive to the acceleration request and the corresponding power requirement of the electric machine exceeding the combined power discharge capacity of the traction battery and the low-voltage power system, deliver power from the traction battery to the electric machine via the high-voltage bus at the power discharge capacity of the traction battery, and deliver power from the low-voltage power system to the electric machine via the low-voltage bus, the DC to DC converter, and the high-voltage bus at a power discharge capacity of the low-voltage power system.

16. The vehicle of claim 13, wherein the controller is further programmed to, responsive to the acceleration request and the corresponding power requirement of the electric machine being less than the power discharge capacity of the traction battery, deliver power from the traction battery to the electric machine via the high-voltage bus at the corresponding power requirement of the electric machine, and deliver zero power from the low-voltage power system to the electric machine.

17. The vehicle of claim 13, wherein the controller is further programmed to, responsive to the regenerative braking and the corresponding power generation value of the electric machine being less than the power charging capacity of the traction battery, deliver power from the electric machine to the traction battery via the high-voltage bus at the corresponding power generation value of the electric machine.

18. The vehicle of claim 13, wherein the power discharge capacity of the low-voltage power system is based on an efficiency of the DC to DC converter and a difference between a discharge limit of the accessory battery and a power requirement of the vehicle accessories.

19. The vehicle of claim 13, wherein the power charging capacity of the low-voltage power system is based on an efficiency of the DC to DC converter and a sum between a charging limit of the accessory battery and a power requirement of the vehicle accessories.

20. The vehicle of claim 13, wherein the controller is programmed to, adjust the power output of the DC to DC converter based on a feedback control and a feedforward, wherein the feedback control maintains a set point voltage at the low-voltage bus when there is zero demand for the accessory battery to support a power demand the high-voltage bus, and wherein the feedback control is disabled such that the set point voltage point at the low-voltage bus is not maintained and the feedforward control is adjusted according to power demand of the high-voltage bus when there is a non-zero demand for the accessory battery to support the power demand of the high-voltage bus.

\* \* \* \* \*